(12) United States Patent
Stark et al.

(10) Patent No.: US 7,288,592 B2
(45) Date of Patent: Oct. 30, 2007

(54) ORGANOFUNCTIONAL SILICONE COPOLYMERS AND THE SAPONIFICATION PRODUCTS THEREOF

(75) Inventors: Kurt Stark, Burgkirchen (DE); Robert Singer, Burghausen (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 315 days.

(21) Appl. No.: 10/507,241

(22) PCT Filed: Apr. 3, 2003

(86) PCT No.: PCT/EP03/03488

§ 371 (c)(1),
(2), (4) Date: Sep. 9, 2004

(87) PCT Pub. No.: WO03/085035

PCT Pub. Date: Oct. 16, 2003

(65) Prior Publication Data

US 2005/0143547 A1    Jun. 30, 2005

(30) Foreign Application Priority Data

Apr. 11, 2002    (DE) .................. 102 15 962

(51) Int. Cl.
*C08F 30/08* (2006.01)
(52) U.S. Cl. ............ 524/866; 524/755; 524/766; 524/765; 524/770; 524/751; 524/773; 526/279
(58) Field of Classification Search ........ 524/755, 524/766, 765, 770, 751, 773, 866; 526/279
See application file for complete search history.

(56) References Cited

U.S. PATENT DOCUMENTS

| 4,136,250 A | * | 1/1979 | Mueller et al. ............... 528/29 |
| 4,172,101 A | * | 10/1979 | Getson ....................... 525/101 |
| 4,987,180 A | | 1/1991 | Ohata et al. |
| 5,086,141 A | | 2/1992 | Georges |
| 5,468,477 A | | 11/1995 | Kumar et al. |
| 5,780,553 A | * | 7/1998 | DeSimone et al. ......... 525/276 |
| 6,727,336 B1 | * | 4/2004 | Ito et al. ..................... 526/279 |

FOREIGN PATENT DOCUMENTS

| DE | 100 64 092 A1 | 7/2002 |
| EP | 0 159 894 | 10/1985 |
| EP | 0 352 339 | 1/1990 |
| EP | 0 545 591 A1 | 6/1993 |
| EP | 0 771 826 A2 | 5/1997 |
| EP | 0 943 634 A1 | 9/1999 |
| EP | 0 959 114 A1 | 11/1999 |
| EP | 1 095 953 A2 | 5/2001 |

OTHER PUBLICATIONS

Abstract WO 00/70388 Nov. 23, 2000.*
Polymer Handbook, 4th Edition (1999), Chapter II, pp. 142-149.
Derwent Abstract corresponding to EP 959 114 [AN 2000-001278].
Derwent Abstract corresponding to DE 100 640 92 [AN 2002-547932].

* cited by examiner

*Primary Examiner*—Margaret G. Moore
(74) *Attorney, Agent, or Firm*—Brooks Kushman P.C.

(57) ABSTRACT

Organosilicone and vinyl ester copolymers free from phase separation are prepared by copolymerizing at least one vinyl ester monomer with organosilicones containing difunctional silicone monomers and optionally a minor amount of monofunctional silicone monomers, in a non-aqueous solvent mixture containing at least one solvent with a transfer coefficient greater than $20 \cdot 10^{-4}$ relative to vinyl acetate.

23 Claims, No Drawings

ORGANOFUNCTIONAL SILICONE COPOLYMERS AND THE SAPONIFICATION PRODUCTS THEREOF

BACKGROUND OF THE INVENTION

1. Field of the Invention

The invention relates to transparent, low-migration organic silicone copolymers of defined melt rheology, to their hydrolysis products, to processes for preparing them, and to the use thereof.

2. Description of the Related Art

Solid resins of vinyl ester polymers or in particular of vinyl ester-ethylene copolymers have a frequent tendency toward blocking. It is known from EP-A 959114 that the surface tackiness of vinyl ester-ethylene copolymers can be reduced by copolymerization with propylene. It is also known that silicones have good release properties; that is, a surface which repels tacky substances. Blends of solid vinyl ester resins with silicones, however, have unsatisfactory properties: owing to the incompatibility of vinyl ester polymer and silicone, phase separation occurs and/or silicone domains develop, and hence the solid resins become cloudy. The development of silicone domains and the presence of unattached silicone, moreover, lead to migration effects.

From the prior art there are a number of processes known in which organic polymers are modified with silicones by polymerizing the monomers in the presence of a silicone: EP-A 0352339 describes protective coatings for concrete structures, which comprise copolymers of divinyl-polydimethylsiloxane with acrylate or methacrylate esters and with vinyl- or acryloyl-functional alkoxysilanes in the form of a solution in organic solvents. Heat-curable acrylic resin solutions in organic solvents, which are used for coatings on metals, especially stainless steel, are subject matter of EP-A 159894: in order to improve the metal adhesion, in particular for the purpose of preventing flaking of the coating on deformation of the coated metal parts, acrylic resin solutions are used, of copolymers formed from (meth)acrylate, hydroxy- or epoxy-functional (meth)acrylate, vinyl-functional polysiloxane, and vinyl-functional silane. For improving the adhesion the polymers are postcrosslinked using organotin compounds as crosslinking catalysts, and are cured thermally.

EP-B 771826 describes aqueous binders for coatings and adhesives which are based on emulsion polymers of vinyl esters, acrylic or methacrylic esters or vinylaromatics and which, as crosslinkers, comprise polysiloxanes having unsaturated radicals, examples being vinyl, acryloyloxy and/or methacryloyloxy groups. In this case the organic monomer is emulsified and polymerized and after a certain point in time, during the reaction, the silicone is added. Additives which can be added subsequently include polymerizable or nonpolymerizable silanes of low molecular mass which allow further, subsequent crosslinking of the polymer with organotin compounds.

EP-A 943634 describes aqueous latices for use as coating materials, which are prepared by copolymerizing ethylenically unsaturated monomers in the presence of a silicone resin containing silanol groups. Inter-penetrating networks (IPNs) are formed between the polymer chains and polysiloxane chains. EP-A 1095953 describes silicone-grafted vinyl copolymers, where a carbosiloxane dendrimer is grafted on the vinyl polymer.

The use of vinyl-functionalized silicones is likewise known in the prior art. Generally, the vinyl silicones are reacted with H-silicones (organic hydropoly-siloxanes) in a hydrosilylation reaction by means of a catalyst (usually a Pt compound), such reaction being described, for example, in EP-A 545591. U.S. Pat. No. 4,987,180 describes the emulsion polymerization of a free-radically polymerizable silicone which contains, for example, mercapto, vinyl or methacryloyloxypropyl groups along the chain and is in the form of an emulsion in water with acrylic and/or methacrylic esters, where up to 10% by weight of the (meth)acrylate monomer may be replaced by further functionalized monomers, such as glycidyl methacrylate (GMA), N-methylolacrylamide (NMA) or acrylic acid, and up to 20% by weight of the (meth)acrylic monomer may be replaced by further monomers, such as styrene or vinyl acetate. The emulsion may further be admixed with H-silicones and subsequently crosslinked further with a catalyst.

Polysiloxane-crosslinked styrene-butadiene copolymers are known from U.S. Pat. No. 5,086,141, the crosslinked copolymers being prepared by the suspension polymerization process. U.S. Pat. No. 5,468,477 relates to vinylsiloxane polymers prepared by polymerization in the presence of mercapto-functional silicone.

DE-A 10064092 relates to polyorganosiloxanes for producing abhesive coatings which cure without introduction of thermal energy or radiation. These are silicone block copolymers composed of a crosslinkable hard segment polymer component and a soft segment polyorganosiloxane component. These silicone block copolymers are prepared by a coupling reaction of the block segments or by polymerization of the hard segment component in the presence of polyorganosiloxane.

The products obtainable with these processes, however, fail to satisfy in respect of transparency, migration, and melting behavior. The object was therefore to provide a solid vinyl ester resin distinguished by high transparency, little or no migration, and advantageous melt rheology, and, consequently, by excellent thermoplastic processing properties.

SUMMARY OF THE INVENTION

These and other objects are achieved by the preparation of non-phase-separated organosilicon copolymers by copolymerizing one or more vinyl ester mnomers with functional organopolysiloxanes having less than 15% non-functional molecules and a majority of functional molecules with two functional groups, in mixture of at least two non-aqueous solvents, where one solvent has a transfer coefficient greater than $20 \times 10^{-4}$ with respect to vinyl acetate.

DETAILED DESCRIPTION OF THE PREFERRED EMBODIMENT(S)

The invention provides organic silicone copolymers and their hydrolysis products, obtainable by polymerizing a1) >50% by weight of one or more monomers from the group consisting of vinyl esters of branched and unbranched alkyl carboxylic acids having from 1 to 15 carbon atoms and a2) from 0 to 20% by weight of one or more monomers from the group consisting of monounsaturated olefins and also dienes and b) from 1 to 50% by weight of one or more silicones with the general formula $R^1_a R_{3-a} SiO(SiR_2O)_n SiR_{3-a} R^1_a$, in which each R is identical or different, and a monovalent, unsubstituted or substituted alkyl radical or alkoxy radical having in each case from 1 to 18 carbon atoms, $R^1$ is a polymerizable group, a is 0 or 1, and n=10 to 1000, from 85 to 100% by weight of the silicones b) containing from one to two polymerizable groups, with silicones b) having only one polymerizable group being used only in a mixture with silicones b) having two polymerizable groups and in a weight ratio≦50/50, and c) from 0 to 10% by weight of one or more hydrolyzable silane monomers from the group consisting of ethylenically unsaturated hydrolyzable silicon compounds and hydrolyzable silicon compounds from the group of the mercaptosilanes, the amounts in % by weight for components a) to c) being based in each case on the overall weight of the monomers used and adding up to 100% by weight, in a nonaqueous solvent in the presence of free-radical initiators, characterized in that it comprises using as nonaqueous solvent a mixture of at least two nonaqueous solvents of which at least one has a transfer constant $C_s$ to vinyl acetate of >20×10$^{-4}$ at 70° C., and, where appropriate, hydrolyzing the products thus obtainable.

Suitable vinyl esters a1) are vinyl esters of branched or unbranched alkyl carboxylic acids having from 1 to 15 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 5 to 11 carbon atoms, examples being VeoVa9$^R$ and VeoVa10$^R$ (trade names of Shell for vinyl esters of α-branched monocarboxylic acids having 9 or 10 carbon atoms). Vinyl acetate is particularly preferred. Suitable comonomers a2) are ethylene, propylene, 1,3-butadiene, and isoprene. Ethylene is preferred.

If desired, from 0.1 to 20% by weight, based on the overall weight of the monomers a) used, of auxiliary monomers can be copolymerized. Examples of auxiliary monomers are vinyl chloride, acrylic acid and methacrylic acid, and monomers from the group of the esters of acrylic or methacrylic acid, such as esters of branched or unbranched alcohols having from 1 to 15 carbon atoms. Preferred methacrylic or acrylic esters are methyl acrylate, methyl methacrylate, ethyl acrylate, ethyl methacrylate, propyl acrylate, propyl methacrylate, n-, iso-, and t-butyl acrylate, n-, iso-, and t-butyl methacrylate, 2-ethylhexyl acrylate, and norbornyl acrylate. Particular preference is given to methyl acrylate, methyl methacrylate, n-, iso-, and t-butyl acrylate, 2-ethylhexyl acrylate, and norbornyl acrylate.

Further auxiliary monomers are glycidyl (meth)acrylate and ethylenically unsaturated monocarboxylic acids, such as crotonic acid, and dicarboxylic acids, such as fumaric acid and maleic acid; ethylenically unsaturated carboxamides and carbonitriles, preferably acrylamide and acrylonitrile; monoesters and diesters of fumaric acid and maleic acid such as the diethyl and diisopropyl esters, and also maleic anhydride, ethylenically unsaturated sulfonic acids and their salts, preferably vinylsulfonic acid and 2-acrylamido-2-methylpropanesulfonic acid. Further suitable auxiliary monomers include cationic monomers such as diallyldimethylammonium chloride (DAD-MAC), 3-trimethylammoniumpropyl(meth)acrylamide chloride (MAPTAC), and 2-trimethylammoniumethyl(meth)acrylate chloride. Further examples are precrosslinking comonomers such as polyethylenically unsaturated comonomers, examples being divinyl adipate, diallyl maleate, allyl methacrylate, butanediol diacrylate, and triallyl cyanurate, or postcrosslinking comonomers, examples being acrylamidoglycolic acid (AGA), methylacrylamidoglycolic acid methyl ester (MAGME), N-methylolacrylamide (NMA), N-methylolmethacrylamide, N-methylolallyl carbamate, alkyl ethers such as the isobutoxy ether or esters of N-methylolacrylamide, of N-methylolmethacrylamide, and of N-methylolallyl carbamate.

Suitable silicones b) are linear or branched polydialkylsiloxanes having a chain length of from 10 to 1000, preferably from 20 to 500, SiR$_2$O units. The fraction of silicone b) is preferably from 5 to 40% by weight, based on the overall weight of the units a), b), and, where appropriate, c).

In the general formula R$^1{}_a$R$_{3-a}$SiO(SiR$_2$O)$_n$SiR$_{3-a}$R$^1{}_a$ examples of radicals R are methyl, ethyl, n-propyl, isopropyl, 1-n-butyl, 2-n-butyl, isobutyl, tert-butyl, n-pentyl, isopentyl, neopentyl, tert-pentyl radical, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical, and cycloalkyl radicals such as cyclopentyl, cyclohexyl, cycloheptyl, and methylcyclohexyl radicals. The radical R is preferably a monovalent hydrocarbon radical having from 1 to 6 carbon atoms, such as methyl, ethyl, n-propyl, isopropyl, n-butyl, sec-butyl, amyl, and hexyl radical, the methyl radical being particularly preferred.

Preferred alkoxy radicals R are those having from 1 to 6 carbon atoms such as methoxy, ethoxy, propoxy, and n-butoxy radical, which may where appropriate also be substituted by oxyalkylene radicals such as oxyethylene or oxymethylene radicals. Particular preference is given to the methoxy and ethoxy radical. Said alkyl and alkoxy radicals R may also, where appropriate, be substituted by, for example, halogen, mercapto groups, epoxy-functional groups, carboxyl groups, keto groups, enamine groups, amino groups, aminoethylamino groups, isocyanato groups, aryloxy groups, alkoxysilyl groups, and hydroxyl groups.

Suitable polymerizable groups R$^1$ are alkenyl radicals having from 2 to 8 carbon atoms. Examples of such polymerizable groups are the vinyl, allyl, butenyl, and also acryloyloxyalkyl and methacryloyloxyalkyl group, the alkyl radicals containing from 1 to 4 carbon atoms. Preference is given to the vinyl group, 3-methacryloyloxypropyl, acryloyloxymethyl, and 3-acryloyloxypropyl group.

Preference is given to α,ω-divinyl-polydimethylsiloxanes, α,ω-di(3-acryloyloxypropyl)-polydimethylsiloxanes, and α,ω-di(3-methacryloyloxypropyl)-polydimethylsiloxanes. In the case of the silicones substituted only once by unsaturated groups, preference is given to α-monovinyl-polydimethylsiloxanes, α-mono-(3-acryloyloxypropyl)-polydimethylsiloxanes, α-mono-(acryloyloxymethyl)-polydimethylsiloxanes, and α-mono-(3-methacryloyloxypropyl)-polydimethylsiloxanes. In the case of the monofunctional polydimethylsiloxanes there is an alkyl or alkoxy radical present on the other end of the chain, a methyl or butyl radical for example.

Preference is also given to mixtures of linear or branched divinyl-polydimethylsiloxanes with linear or branched monovinyl-polydimethylsiloxanes and/or unfunctionalized polydimethylsiloxanes (the latter possess no polymerizable group). The vinyl groups are located at the end of the chain. Examples of such mixtures are silicones of the solvent-free Dehesive® 6 series (branched) or Dehesive® 9 series (unbranched) from Wacker-Chemie GmbH. In the case of the binary or ternary mixtures the fraction of the unfunctional polydialkylsiloxanes is up to 15% by weight, preferably up to 5% by weight; the fraction of the monofunctional polydialkylsiloxanes is up to 50% by weight; and the fraction of the difunctional polydialkylsiloxanes is at least 50% by weight, preferably at least 60% by weight, based in each case on the overall weight of the silicone fraction b).

Most preferred as silicone b) are α,ω-divinyl-polydimethylsiloxanes, or a binary mixture of α,ω-divinyl-polydimethylsiloxanes with α-monovinyl-polydimethylsiloxanes, or a ternary mixture of α,ω-divinyl-polydimethylsiloxanes, α-monovinyl-polydimethylsiloxanes, and unfunctionalized polydimethylsiloxane.

Besides these monomers, hydrolyzable silane monomers c) as well may be copolymerized additionally. Suitable hydrolyzable silicon compounds are, for example, ethylenically unsaturated and hence copolymerizable silicon compounds of the general formula $R^3SiR^2_{0-2}(OR^4)_{1-3}$, in which $R^2$ has the definition $C_1$ to $C_3$ alkyl radical, $C_1$ to $C_3$ alkoxy radical or halogen (e.g., Cl or Br), $R^3$ has the definition $CH_2=CR^3-(CH_2)_{0-1}$ or $CH_2=CR^5CO_2(CH_2)_{1-3}$, $R^4$ is a branched or unbranched, unsubstituted or substituted alkyl radical having from 1 to 12 carbon atoms, preferably from 1 to 3 carbon atoms, or is an acyl radical having from 2 to 12 carbon atoms, it being possible for $R^4$, where appropriate, to be interrupted by an ether group, and $R^5$ stands for H or $CH_3$.

Preference is given to γ-acryloyloxy- and γ-methacryloyloxypropyltri(alkoxy)silanes, α-methacryloyloxy-methyltri(alkoxy)silanes, γ-methacryloyloxypropyl-methyldi(alkoxy)silanes, vinylalkyldi(alkoxy)silanes, and vinyltri(alkoxy)silanes, examples of alkoxy groups that can be used being methoxy, ethoxy, methoxyethylene, ethoxyethylene, methoxypropylene glycol ether, and ethoxypropylene glycol ether radicals. Examples of suitable silicon compounds are vinyltrimethoxysilane, vinylmethyldimethoxysilane, vinyltriethoxysilane, vinylmethyldiethoxysilane, vinyltripropoxysilane, vinyltriisopropoxysilane, vinyltris(1-methoxy)isopropoxysilane, vinyltributoxysilane, vinyltriacetoxysilane, 3-methacryloyloxypropyltrimethoxysilane, 3-methacryloyloxypropylmethyldimethoxysilane, methacryloyloxymethyltrimethoxysilane, 3-methacryloyloxypropyltris(2-methoxyethoxy)silane, vinyltrichlorosilane, vinylmethyldichlorosilane, vinyltris(2-methoxyethoxy)silane, trisacetoxyvinylsilane, allylvinyltrimethoxysilane, allytriacetoxysilane, vinyldimethylmethoxysilane, vinyldimethylethoxysilane, vinylmethyldiacetoxysilane, vinyldimethylacetoxysilane, vinylisobutyldimethoxysilane, vinyltriisopropyloxysilane, vinyltributoxysilane, vinyltrihexyloxysilane, vinylmethoxydihexyloxysilane, vinyltrioctyloxysilane, vinyldimethoxyoctyloxysilane, vinylmethoxydioctyloxysilane, vinylmethoxydilauryloxysilane, vinyldimethoxylauryloxysilane, and also polyethylene-glycol-modified silanes.

As silanes, greatest preference is given to vinyltrimethoxysilane, vinylmethyldimethoxysilane, vinyltriethoxysilane, vinylmethyldiethoxysilane, vinyltris(1-methoxy)isopropoxysilane, methacryloyloxypropyltris(2-methoxyethoxy)silane, 3-methacryloyloxypropyltrimethoxysilane, 3-methacryloyloxypropylmethyldimethoxysilane, and methacryloyloxymethyltrimethoxysilane, and also mixtures thereof, especially mixtures of 2 or more silanes from the group consisting of 3-methacryloyloxypropyltrimethoxysilane and methacryloyloxymethyltrimethoxysilane with vinyltrimethoxysilane and vinyltriethoxysilane.

Greatest preference is given to organic silicone copolymers containing as monomer units a) vinyl acetate, or vinyl acetate and ethylene, or vinyl acetate and VeoVa9, or vinyl acetate and VeoVa10, or vinyl acetate, ethylene, and VeoVa10; and containing as silicone b) a binary mixture of α,ω-divinyl-polydimethylsiloxane with α-monovinyl-polydimethylsiloxane or a ternary mixture of α,ω-divinyl-polydimethylsiloxane, α-monovinyl-polydimethylsiloxane, and unfunctionalized polydimethylsiloxane.

The organic silicone copolymers are prepared by polymerization in a nonaqueous organic solvent in the presence of free-radical initiators, said nonaqueous solvent being a mixture of at least two nonaqueous solvents of which at least one has a transfer constant $C_s$ to vinyl acetate of $C_s > 20 \times 10^{-4}$ at 70° C. The reaction temperature is from 20° C. to 100° C., preferably from 40° C. to 80° C. Polymerization is generally conducted under atmospheric pressure. The copolymerization of monomers which are gaseous at room temperature such as ethylene is operated under pressure, generally between 1 and 100 bar. As a general rule, the polymerization is carried out through to a solids content of from 15 to 90%, preferably to a solids content of from 20 to 60%.

Suitable free-radical initiators include oil-soluble initiators, such as t-butyl peroxy-2-ethylhexanoate, t-butyl peroxypivalate, t-butyl peroxyneodecanoate, dibenzoyl peroxide, t-amyl peroxypivalate, di(2-ethylhexyl) peroxydicarbonate, 1,1-bis(t-butylperoxy)-3,3,5-trimethylcyclohexane, and di(4-t-butylcyclohexyl) peroxydicarbonate. Also suitable are azo initiators such as azobisisobutyronitrile. The initiators are used generally in an amount of from 0.005 to 3.0% by weight, preferably from 0.1 to 1.5% by weight, based on overall monomer.

Adjustment of the molecular weight and of the degree of polymerization is known to the skilled worker. It can be done, for example, by adding regulator, through the solvent content, through variation in the initiator concentration, and through variation in the temperature. Regulators or chain transfer agents are, for example, acetaldehyde or compounds containing mercapto groups, such as dodecyl mercaptan or mercapto-functional silicones.

Suitable nonaqueous organic solvents are, for example, tetrahydrofuran (THF), chloroform ($C_s = 554 \times 10^{-4}$ at 70° C.), petroleum ether, heptane ($C_s = 17 \times 10^{-4}$ at 50° C.), cyclohexane ($C_s = 7 \times 10^{-4}$ at 60° C.), ethyl acetate ($C_s = 7.8 \times 10^{-4}$ at 70° C.), methyl acetate ($C_s = 1.6 \times 10^{-4}$ at 60° C.), isopropanol ($C_s = 44.6 \times 10^{-4}$ at 70° C.), ethanol ($C_s = 26.3 \times 10^{-4}$ at 70° C.), methanol ($C_s = 5.5 \times 10^{-4}$ at 70° C.), t-butanol ($C_s = 0.5 \times 10^{-4}$ at 70° C.), acetone ($C_s = 26 \times 10^{-4}$ at 70° C.), toluene ($C^s = 21.1 \times 10^{-4}$ at 70° C.), benzene ($C_s = 5.3 \times 10^{-4}$ at 70° C.), methyl ethyl ketone ($C_s = 73.8 \times 10^{-4}$ at 60° C.), diethyl ether ($C^s = 45.3 \times 10^{-4}$ at 60° C.) or p-dioxane ($C_s = 49.1 \times 10^{-4}$ at 70° C.), the $C_s$ figures relating to vinyl acetate. The transfer constant $C_s$ of the nonaqueous solvents can be found, for example, in Polymer Handbook, 4th Edition (1999), Chap. II, the figures for vinyl acetate being set out on pages 142 to 149. Above values for $C_s$ have been taken from that literature source.

Preferred solvents with $C_s > 20 \times 10^{-4}$ at 70° C. are ethanol and isopropanol. In the case of the solvent mixtures, the fraction of solvent with $C_s > 20 \times 10^{-4}$ is generally from 3 to 50% by weight, preferably from 5 to 30% by weight, with particular preference from 7 to 20% by weight. Particular preference is given to solvent mixtures with isopropanol; a mixture of ethyl acetate and isopropanol is a most-preferred one.

The polymerization may be conducted with all or individual constituents of the reaction mixture being included in the initial charge, or with some of all or certain constituents of the reaction mixture being included in the initial charge and the remainder metered in subsequently, or by the metering technique without an initial charge. A preferred procedure is to include from 3 to 40% by weight of a mixture of the monomers a), b), and, where appropriate, c), in the desired proportions, in the initial charge and to meter in the remainder of the monomers a), b), and, where appropriate, c) as a mixture. It is further preferred to include some of the initiator, preferably from 3 to 50% by weight, in the initial charge and to meter in the remainder. Particular preference is given to adding the monomers a), b), and, where appropriate, c) in such a way that their ratio remains constant at any time during the polymerization.

After the end of the polymerization, residual monomers can be removed by postpolymerization using known methods. Volatile residual monomers and further volatile constituents can also be removed by distillation, preferably under reduced pressure.

The organic silicone copolymers can be used in the form of their solution or, following removal of the solvent or precipitation of the resin fraction, as solid resins. In the latter case the procedure is generally to melt the resin and then process it to granules.

In order to prepare the hydrolysis products, the organic silicone copolymer is hydrolyzed in a manner known to the skilled worker in alcoholic solution, using the customary acidic or alkaline catalysts. Suitable solvents are aliphatic alcohols having from 1 to 6 carbon atoms, preferably methanol or ethanol. Alternatively, hydrolysis can be conducted in a mixture composed of water and aliphatic alcohol. Acidic catalysts are, for example, strong mineral acids, such as hydrochloric acid or sulfuric acid, or strong organic acids, such as aliphatic or aromatic sulfonic acids. Alkaline catalysts are used with preference. They are, for example, the hydroxides, alkoxides, and carbonates of alkali metals and alkaline earth metals. The catalysts are used in the form of their aqueous or alcoholic solutions. The amounts of alkaline catalyst used are generally from 0.2 to 20.0 mol %, based on organic silicone polymer.

Hydrolysis is conducted generally at temperatures from 20° C. to 70° C., preferably 30° C. to 60° C. Addition of the catalyst solution initiates the transesterification. When the desired degree of hydrolysis is reached, generally between 40 and 100 mol %, the transesterification is terminated. In the case of acid-catalyzed transesterification, termination is accomplished by adding alkaline reagents. In the case of the preferred alkali-catalyzed transesterification, termination is accomplished by adding acidic reagents, such as carboxylic acids or mineral acids. After the hydrolysis reaction the product is separated from the liquid phase. This can be done by means of conventional apparatus or solid/liquid separation, by centrifugation or filtration, for example. An alternative procedure is to distill off the alcoholic solvent and replace it successively with water. In this way the hydrolysis product is obtained in the form of an aqueous solution.

The organic silicone copolymers and their hydrolysis products are suitable for use as release agents and coating materials: for example, for producing abhesive (nonadhering) coatings in release coating. They are also suitable for coating textile, paper, wood, films, and metals, as protective or antifouling coatings, for example. Further fields of use are in the construction sector, as an additive to cementitious and noncementitious systems, and in architectural preservation, particularly for producing weathering-resistant coatings or sealants, in the polish sector, and as additives to antifoam formulations, and in textile treatment. They are also suitable as modifiers and water repellents and as additives to cosmetics, such as hairsprays or hairsetting agents. In particular, the hydrolysis products of the organic silicone copolymers are suitable as additives to cosmetics, in shampoos, creams, and hairsprays, for example, and also for use in the polish sector.

The organic silicone copolymers are used preferably for producing abhesive coatings, i.e., coatings which repel tacky substances, as in the case, for example, of release paper, polymeric release sheets or release films. For this purpose the organic silicone copolymers can be applied to the substrates by extrusion or else supplied during the production of the sheets in a coextrusion operation. In addition, the organic silicone copolymers, preferably in the form of solutions in organic solvents, such as toluene, petroleum spirit, ethyl acetate or xylene, can be applied to surfaces that are to be made repellent to tacky substances. Application may take place in any way which is suitable and widely known for the production of coatings from liquid materials: for example, by dipping, spreading, flow coating, spraying, roller application, printing, by means of an offset gravure coating apparatus, for example, by blade or knife coating, or using an airbrush.

By proceeding in accordance with the invention it is possible to obtain organic silicone copolymers which are distinguished by high transparency (glass-clear products) and negligible migration of the silicone fraction. Through the use of the characterizing solvent mixture, compatibility between the organic polymer fraction and the silicone fraction is increased to such an extent that the phase separation which leads to clouding and migration effects is avoided. The use of the solvent mixture also leads to products having an advantageous, defined melt rheology: that is, a complex melt viscosity of from 5 to 30,000 Pas and a phase angle $\delta$ of $\geq 45°$, in each case from a certain temperature or within a temperature window in the temperature range from 100° C. to 140° C.

The phase angle $\delta$ is defined as follows: $\tan \delta = G''/G'$, where $G'$ is the storage modulus and describes the elastic properties and $G''$ is the loss modulus and provides information on the viscous properties. This defined melt viscosity means that, despite the high silicone fraction, the organic silicone copolymers exhibit a pronounced thermoplastic behavior and can therefore be processed very effectively.

EXAMPLES

Regulator (Mercapto-PDMS):
Mercapto-polydimethylsiloxane having a chain length of approximately 150 dimethylsiloxane groups and containing about 3 mercaptopropyl groups in the chain.

PDMS Mixture:
Mixture of three polydimethylsiloxanes having a chain length of in each case about 100 dimethylsiloxane units, containing 5% by weight unfunctionalized polydimethylsiloxane, 20% by weight α-monovinylpolydimethylsiloxane, and 75% by weight α,ω-divinylpolydimethylsiloxane.

Example 1 (Comparative)

A 2 l glass stirring pot with an anchor stirrer, reflux condenser and metering devices was charged with 675.0 g of ethyl acetate, 7.0 g of PDMS mixture, 0.8 g of regulator, 1.1 g of PPV (t-butyl perpivalate, 75% strength solution in aliphatics) and 70.6 g of vinyl acetate. This initial charge was subsequently heated to 70° C. at a stirrer speed of 200 rpm. After the internal temperature of 70° C. had been reached, the metered addition of initiator (30.9 g of ethyl acetate and 4.1 g of PPV) was commenced at a rate of 7.6 ml/h. Ten minutes after the start of the initiator feed, the monomer feed (56.5 g of PDMS mixture, 6.3 g of regulator and 564.9 g of vinyl acetate) was run in at a rate of 168 ml/h.

The initiator feed extended over a period of 310 minutes, the monomer feed ending 60 minutes earlier. After the end of both feeds, polymerization was continued at 70° C. for 90 minutes. The two-phase polymer solution obtained was subsequently concentrated to dryness in a rotary evaporator with heating. Cooling to room temperature gave a hard, cloudy/white resin.

Analyses: SC: 96.8%, GC analysis: residual Vac content 0.96%, acid number 1.12 mg KOH/g, viscosity (Hoppler, 10% strength solution in ethyl acetate)=3.60 mpas, SEC $M_w$=65325, $M_n$=20734, polydispersity=3.15; 2 glass transition temperatures (Tg): Tg1=−121.0° C. (silicone), Tg2=34.1° C. (PVAc)

Example 2

Example 1 was repeated with the following difference:

Initial charge: 737.2 g of ethyl acetate, 137.2 g of isopropanol, 9.5 g of PDMS mixture, 0.5 g of PPV and 34.3 g of vinyl acetate.

Initiator feed: 51.4 g of ethyl acetate and 2.0 g of PPV at a rate of 11.5 ml/h over 310 minutes.

Monomer feed: 76.2 g of PDMS mixture and 274.3 g of vinyl acetate at a rate of 93.4 ml/h over 240 minutes. Subsequent polymerization at 70° C. for 90 minutes. A 1-phase polymer solution was obtained which was dried as described above. The result was a resin which is transparent at room temperature.

Analyses: SC: 99.0%, GC analysis: residual Vac content 0.019%; residual ethyl acetate content 0.8%; residual isopropanol content 0.17%; acid number 2.81 mg KOH/g, viscosity (Höppler, 10% strength solution in ethyl acetate) =1.24 mPas, SEC $M_w$=16179, $M_n$=5634, polydispersity=2.9; Tg=27.0° C.

Example 3 (Comparative)

Example 1 was repeated with the following difference:

Initial charge: 93.1 g of ethyl acetate, 140.6 g of PDMS mixture, 2.1 g of PPV and 140.6 g of vinyl acetate.

Initiator feed: 61.5 g of ethyl acetate and 8.2 g of PPV at a rate of 15.2 ml/h over 310 minutes. Monomer feed: 1120.0 g of vinyl acetate at a rate of 302.5 ml/h over 240 minutes.

Subsequent polymerization at 70° C. for 90 minutes. Shortly after the start of the initiator feed, very severe thickening occurred, at which point 400 ml of ethyl acetate were added for dilution. The product was dried as described above.

Analyses: Impossible to work up. White, crosslinked mass, swollen by solvent.

Example 4 (Comparative)

Example 1 was repeated with the following difference:

Initial charge: 675.3 g of ethyl acetate, 7.9 g of PDMS mixture, 1.1 g of PPV and 70.6 g of vinyl acetate.

Initiator feed: 30.9 g of ethyl acetate and 4.1 g of PPV at a rate of 15.2 ml/h over 310 minutes.

Monomer feed: 62.8 g of PDMS mixture and 565.0 g of vinyl acetate at a rate of 302.5 ml/h over 240 minutes. Subsequent polymerization at 70° C. for 120 minutes. The product was dried as described above.

Analyses: SC: 99.6%, GC analysis: residual Vac content <5 ppm; acid number 1.68 mg KOH/g, viscosity (Höppler, 10% strength solution in ethyl acetate)=6.1 mPas, SEC $M_w$=135808, $M_n$=23483, polydispersity=5.8; 2 glass transition temperatures (Tg): Tg1=−123.0° C. (silicone), Tg2=32.8° C. (PVAc).

Example 5

A 120 l stirred tank with an anchor stirrer, reflux condenser and metering devices was charged with 34.17 kg of ethyl acetate, 3.42 kg of isopropanol, 189.6 g of PDMS mixture, 25.6 g of PPV and 1.71 kg of vinyl acetate. The stirred tank was subsequently heated to 70° C. at a stirrer speed of 95 rpm. After the internal temperature of 70° C. had been reached, the metered addition of initiator (2.56 kg of ethyl acetate and 99.7 g of PPV) was commenced at a rate of 512.0 g/h. Ten minutes after the start of the initiator feed, the monomer feed (1.52 kg of PDMS mixture and 13.67 kg of vinyl acetate) was run in at a rate of 3.80 kg/h. The initiator feed extended over a period of 310 minutes, the monomer feed ending 60 minutes earlier. After the end of both feeds, polymerization was continued at 70° C. for 120 minutes. The one-phase polymer solution obtained was subsequently distilled in the stirred tank at 95° C. with addition of 1000 ml of water and subsequently dried at 120° C. for 1 hour. Cooling to room temperature gave a hard, transparent resin.

Analyses: SC: 99.80%, GC analysis: residual Vac content <5 ppm; residual ethyl acetate 89 ppm; residual isopropanol 10 ppm, acid number 2.80 mg KOH/g, viscosity (Höppler, 10% strength solution in ethyl acetate)=1.39 mPas, SEC $M_w$=14521, $M_n$=5445, polydispersity =2.67; Tg=30.8° C.

Example 6

Example 5 was repeated with the following difference:

Initial charge: 29.95 kg of ethyl acetate, 7.49 kg of isopropanol; 614.6 g of PDMS mixture, 18.7 g of PPV and 1.25 g of vinyl acetate.

Initiator feed: 1.87 kg of ethyl acetate and 72.8 g of PPV at a metering rate of 375.0 g/h over 310 minutes. Monomer feed: 4.92 kg of PDMS mixture and 9.98 kg of vinyl acetate at a metering rate of 3.73 kg/h over 240 minutes.

The product was worked up as in Example 5.

Analyses: SC: 99.67%, GC analysis: residual Vac content <5 ppm; acid number 3.93 mg KOH/g, viscosity (Höppler, 10% strength solution in ethyl acetate)=1.35 mpas, SEC $M_w$=15494, $M_n$=4471, polydispersity D=3.47; Tg=24.9° C.

Example 7 (Comparative)

A commercially available solid polyvinyl acetate homopolymer resin (Vinnapas B 1,5 from Wacker Polymer Systems) is used in testing.

Example 8

A 2 liter stirred tank (unpressurized), with reflux condenser, metering devices and an anchor stirrer, was charged with 556.0 g of a 47.6% strength solution of a copolymer having 12.28 mol % (10.75% by weight) dimethylsiloxane units and 87.72 mol % (89.25% by weight) vinyl acetate units in methanol, prepared as in Example 5, and this initial charge was diluted to a solids content of 20% with methanol. This solution was then heated to 35° C. Then 4.6 ml of 45% strength sodium hydroxide solution (in water/methanol) were added quickly. Exactly 9 minutes after the addition of the hydroxide solution, the pH was adjusted to 7 using concentrated acetic acid. In order to obtain the precipitated hydrolysis product as an aqueous solution, the suspension was heated for distillation and the distillate was replaced by water. This procedure was continued until all of the methanol had been replaced by water.

An aqueous solution of a dimethylsiloxane-vinyl acetate-vinyl alcohol terpolymer was obtained with the following composition: 8.2 mol % (13.9% by weight) vinyl acetate units, 79.5 mol % (68.3% by weight) vinyl alcohol units, 12.3 mol % (17.8% by weight) dimethylsiloxane units.

Analyses: Colloidal solution, transparent to slightly cloudy;

SC: 14.25%; acid number AN: 3.6 mg KOH/g; hydrolysis number HN: 90.4 mg KOH/g; pH of the 4% strength solution: 6.0

Particle size determination for a 9.7% strength aqueous solution: number-average particle size: 171.7 nm Example 9

A 2 liter stirred tank (unpressurized), with reflux condenser, metering devices and an anchor stirrer, was charged with 495.5 g of a 50.8% strength solution of a copolymer having 26.37 mol % (23.54% by weight) dimethylsiloxane units and 73.63 mol % (76.46% by weight) vinyl acetate units in methanol, prepared as in Example 2, and this initial charge was diluted to a solids content of 20% with methanol. This solution was then heated to 35° C. Then 4.6 ml of 45% strength sodium hydroxide solution (in water/methanol) were added quickly. Exactly 13 minutes after the addition of the hydroxide solution, the pH was adjusted to 7 using concentrated acetic acid. In order to obtain the precipitated hydrolysis product as an aqueous solution, the suspension was heated for distillation and the distillate was replaced by water. This procedure was continued until all of the methanol had been replaced by water.

An aqueous solution of a dimethylsiloxane-vinyl acetate-vinyl alcohol terpolymer was obtained with the following composition: 5.9 mol % (9.4% by weight) vinyl acetate units, 67.7 mol % (54.7% by weight) vinyl alcohol units, 26.4 mol % (35.9% by weight) dimethylsiloxane units.

Analyses: Cloudy, colloidal solution

SC: 9.43%; AN: 1.1 mg KOH/g; HN: 61.2 mg KOH/g; pH of the 4% strength solution: 6.85

Particle size determination for a 9.43% strength aqueous solution: number-average particle size: 245.6 nm Performance Tests Determination of the Release Figures:

The organic silicone copolymers from the examples were dissolved in toluene or ethyl acetate with a concentration of 40% or 50% by weight. PP (polypropylene) or PET (polyethylene terephthalate) films were each coated with the solution using a glass rod (in a coat thickness of approximately 40 μm) and the abhesive properties were determined in accordance with FINAT Test Method No. 3 using the commercially available TESA test adhesive tapes A 7475, K 7476, and T 154. The results are summarized in Table 1 below. The lower the test figure, the greater the release effect (and the better the release behavior). In the case of a polymer which is so adhesive that the strip of adhesive tape can no longer be separated from the coating produced using this polymer, the designation "blocked" is used. In this case there are no longer any abhesive properties, and no measurement can be obtained.

Migration Test:

The organic silicone copolymers from the examples were dissolved in toluene or ethyl acetate with a concentration of 40% by weight. The PP (polypropylene) or PET (polyethylene terephthalate) films were each coated with the solution using a glass rod (with a coat thickness of approximately 40 μm). Tesa film was adhered to the cured coating and the Tesa tape was pressed firmly with the finger and then pulled off. The procedure was repeated twice. For assessment, the Tesa tape was bonded to itself (loop test) and pulled apart. Assessment was made using the school grading system in 6 stages:

1: no migration, Tesa tape sticks just as well as beforehand (=very good result);

6: very severe migration; Tesa tape no longer sticks to itself, adhesive damaged by silicone (=very poor result).

Bond Strength Retention or Residual Bond Strength:

In analogy to the above tests, the organic silicone copolymer was applied to film and cured. Tesa film was adhered to the cured coating, the Tesa tape was pressed firmly with the finger, and the Tesa film was left on the coated polymer film for 24 hours. The Tesa film was then pulled off and was subsequently adhered to an uncoated substrate.

The measurement of the force for removal by pulling was related to the force required for an identical Tesa strip which had not been adhered to a coated film beforehand.

In this test, a high percentage is best; this means that 100% is obtained when there is no reduction in bond strength and no damage to the adhesive.

Visual Assessment of Transparency:

1: absolutely transparent, glass-clear

2: very slight clouding

3: marked clouding

4: severe clouding, product is white, opaque

The results of the abovementioned tests are summarized in Table 1.

Blocking Test:

A DIN A4 paper was coated with a 40% strength solution of each of the organic silicone copolymers from the examples in ethyl acetate (thickness: 500 micrometers with doctor blade) and dried for 5 days.

Thereafter a sample with an area of 5 cm×5 cm was cut out. The sample strips were each placed on identically dimensioned sample strips of untreated paper, then placed between two glass plates and weighted with a weight of 5 kg at 40° C. (T>Tg!) for 24 hours. Blocking was tested by pulling the two paper surfaces apart by hand.

1: papers can easily be separated, no blocking, no paper tearing, no paper fibers remain on the coating 2: papers are more difficult to separate, few paper fibers remain on the coating, slight tearing of paper occurs; slight blocking 3: the papers are ideally bonded to one another and can no longer be separated; the polymer has no abhesive effect at all.

The results are summarized in Table 2.

Melt Rheology:

The melt rheology was determined using the Bohlin CVO 120 HR instrument in a temperature range from 100° C. to 180° C., up to 220° C. in exceptional cases. The plate/plate measuring system was chosen, with a gap distance of 200 to 1000 μm (depending on sample). With oscillating measurements at a frequency of 1 Hz, the complex melt viscosity η*, the storage modulus G' and the loss modulus G" were measured. The phase angle δ was determined by tan δ=G"/G'.

The results are summarized in Table 3.

TABLE 1

| Ex. | Initial charge PDMS % | Initial charge regulator % | ppw IP | RE1 N/m | RE2 N/m | RE3 N/m | MI score | RB % | T (score) | phases |
|---|---|---|---|---|---|---|---|---|---|---|
| Ex. 1 (c) SC: 50% | 11.1 | 11.1 | — | 152 | — | 68 | 3–4 | 85 | 4, white, | 2-phase |
| Ex. 2 SC: 30% | 11.1 | — | 34.8 | 81 | 37 | 46 | 1–2 | 99 | 1 | 1-phase |
| Ex. 3 (c) SC: 90% | 100 | — | — | — | — | — | — | — | 4, white, | crosslinked |
| Ex. 4 (c) SC: 50% | 11.1 | — | — | — | — | — | — | — | 4, white, | crosslinked |
| Ex. 5 SC: 30% | 11.1 | — | 20 | 131 | 62 | 61 | 1–2 | 97 | 1 | 1-phase |
| Ex. 6 SC: 30% | 11.1 | — | 44.7 | 37 | 42 | 3.3 | 1 | 97.5 | 1 | 1-phase |
| Ex. 7 (c) | — | — | — | b | b | b | — | — | 1 | 1-phase | ppw IP = Parts by weight of isopropanol, based on the overall weight of the monomers used.
RE1 = Release value with test adhesive tape A7475
RE2 = Release value with test adhesive tape K7476
RE3 = Release value with test adhesive tape T154
b = Blocked
MI = Evaluated migration
RB = Residual bond strength
T = Optical assessment of the transparency of the dried organic silicone copolymer
Phases = Phase behavior of the organic silicone copolymer, 30% in ethyl acetate Comparing the results in Table 1 for Example 1 (comparative; just ethyl acetate) with Examples 2, 5, and 6 (ethyl acetate/isopropanol solvent mixture) shows that only with the solvent mixture are the desired products (in terms of migration and residual bond strength) obtained.

Comparing Comparative Examples 1, 3, and 4 (ethyl acetate only) with Examples 2, 5, and 6 (ethyl acetate/isopropanol solvent mixture) shows that only with the solvent mixture are the desired products (in terms of phase behavior and transparency) obtained.

Comparing Comparative Example 7 with Examples 5, 2, and 6 demonstrates that the release figures go down as the silicone fraction increases. This underscores the abhesive effect of the silicone fraction. Without any silicone, no release behavior at all is observed, as demonstrated by Comparative Example 7.

TABLE 2

| Example | Blocking test |
|---|---|
| Ex. 1 (c) | 2 |
| Ex. 2 | 1 |
| Ex. 3 (c) | not possible |
| Ex. 4 (c) | not measured |
| Ex. 5 | 2 |
| Ex. 6 | 1 |
| Ex. 7 (c) | 3 |

Comparing Examples 2, 5, and 6 with Example 7 (comparative) shows again that by modification with silicone fractions the blocking behavior of solid vinyl acetate resins is greatly improved.

TABLE 3

| Example | δ (°) | η* (Pas) | G' (Pa) | G" (Pa) | Remarks |
|---|---|---|---|---|---|
| Values at temperature 100° C. | | | | | |
| Ex. 1 (c) | 54.2 | 11767 | 43302 | 59930 | Thermoplastic, 2-phase |
| Ex. 2 | 56.2 | 895 | 3132 | 4674 | Thermoplastic, 1-phase |
| Ex. 3 (c) | — | — | — | — | Crosslinked |
| Ex. 5 | 77.8 | 950 | 1256 | 5835 | Thermoplastic, 1-phase |
| Values at [[T =]] 140° C. | | | | | |
| Ex. 4 (c) | 43.5 | 5047 | 22985 | 21845 | Crosslinked, 2-phase |
| Ex. 6 | 48.7 | 93 | 387 | 440 | Thermoplastic, 1-phase |

δ = phase angle;
η* = complex melt viscosity;
G' = storage modulus;
G" = loss modulus Comparing Examples 2, 5, and 6 with Comparative Examples 1, 3, and 4 shows that only with the solvent mixture as claimed is the required melt rheology obtained.

The invention claimed is:

1. A solid, transparent organic silicone copolymer or hydrolysis product thereof, prepared by solution polymerizing monomers comprising:
  a1) ≧50% by weight of at least one vinyl ester of optionally branched alkyl carboxylic acids having from 1 to 15 carbon atoms, and
  a2) from 0 to 20% by weight of one or more monounsaturated olefins and/or dienes, and
  b) from 1 to 50% by weight of one or more silicones of the formula $R^1_a R_{3-a} SiO(SiR_2O)_n SiR_{3-a} R^1_a$, in which each R is an identical or different monovalent, optionally substituted $C_{1-18}$ alkyl or $C_{1-18}$ alkoxy radical, $R^1$ is a polymerizable group, a is 0 or 1, and n is 10 to 1000, from 85 to 100% by weight of the silicones b) containing one or two polymerizable groups, with silicones b) having only one polymerizable group (b1) used only in admixture with silicones b) having two polymerizable groups (b2) in a weight ratio b1):b2)≦1:1, and c) from 0 to 10% by weight of one or more ethylenically unsaturated hydrolyzable silicon compound monomers or mercaptosilane monomers different from silicones b), the amounts in % by weight for components a) to c) based on the overall weight of the monomers used and adding up to 100% by weight, in a nonaqueous solvent mixture in the presence of at least one free-radical initiator, wherein the nonaqueous solvent mixture comprises a mixture of at least two nonaqueous solvents of which at least one has a transfer constant $C_s$ to vinyl acetate of greater than $20 \times 10^{-4}$ at 70° C., wherein the silicone copolymer has a complex melt viscosity of from 5 to 30,000 mPa·s and a phase angle δ of 45°, measured at a temperature within the range of 100° C. to 140° C., and optionally hydrolyzing the product thus obtained.

2. The copolymer of claim 1 which contains from 5 to 40% by weight of polymerized silicone monomers b) based on the total weight of the copolymer.

3. The product of claim 1, wherein at least one silicone b) is selected from the group consisting of α,ω-divinyl-polydimethylsiloxanes, α,ω-di(3-acryloyloxypropyl)-polydimethylsiloxanes, α,ω-di(3-methacryloyloxypropyl)-polydimethylsiloxanes, α-monovinyl-polydimethylsiloxanes, α-mono(3-acryloyloxypropyl)-polydimethylsiloxanes, α-mono(acryloyloxvmethyl)-polydimethylsiloxanes, and α-mono(3-methacryloyloxypropyl)-polydimethylsiloxanes.

4. The product of claim 1, wherein said hydrolyzable silane monomers c) comprise ethylenically unsaturated and hence copolymerizable silicon compounds of the general formula $R^3SiR^2_{0-2}(OR^4)_{1-3}$, in which $R^2$ is a $C_1$ to $C_3$ alkyl radical, $C_1$ to $C_3$ alkoxy radical, or halogen; $R^3$ is $CH_2=CR^3-(CH_2)_{0-1}$ or $CH_2=CR^5CO_2(CH_2)_{1-3}$; $R^4$ is an optionally branched, optionally substituted $C_{1-12}$ alkyl radical or is a $C_{2-12}$ acyl radical, $R^4$ optionally being interrupted by an ether group; and $R^5$ is H or $CH_3$.

5. The product of claim 1, wherein the solvent mixture comprises one or more solvents selected from the group consisting of tetrahydrofuran, chloroform, heptane, cyclohexane, petroleum ether, diethyl ether, methyl ethyl ketone, p-dioxane, ethyl acetate, methyl acetate, isopropanol, ethanol, methanol, t-butanol, acetone, toluene, and benzene.

6. The product of claim 1, wherein the fraction of solvent with $C_s > 20 \times 10^{-4}$ in the solvent mixture is from 3 to 50% by weight based on the total weight of solvent.

7. The product of claim 1, wherein the solvent mixture comprises ethanol, isopropanol, or mixtures thereof.

8. The product of claim 1, wherein the solvent mixture comprises a mixture of ethyl acetate and isopropanol.

9. A release agent or coating material for producing abhesive coatings, comprising the product of claim 1.

10. A coating material for coating textile, paper, wood, films, or metals, comprising the product of claim 1.

11. A weathering-resistant coating or sealant for use in architectural preservation comprising the product of claim 1.

12. A polymer modifier or a water repellent, comprising the product of claim 1.

13. A cosmetic additive, comprising the product of claim 1.

14. A polish, comprising the product of claim 1.

15. An antifoam, comprising the product of claim 1.

16. A textile treatment composition, comprising the product of claim 1.

17. In a cementitious or noncementitious construction material, wherein one or more polymer additives are employed, the improvement comprising employing as at least one polymer additive, the product of claim 1.

18. A solid, transparent organic silicone copolymer or hydrolysis product thereof, prepared by solution polymerizing monomers comprising:

a1) ≧50% by weight of at least one vinyl ester of optionally branched alkyl carboxylic acids having from 1 to 15 carbon atoms, and a2) from 0 to 20% by weight of one or more monounsaturated olefins and/or dienes, and b) from 1 to 50% by weight of one or more silicones of the formula $R^1_aR_{3-a}SiO(SiR_2O)_nSiR_{3-a}R^1_a$, in which each R is an identical or different monovalent, optionally substituted $C_{1-18}$ alkyl or $C_{1-18}$ alkoxy radical, R1 is a polymerizable group, a is 0 or 1, and n is 10 to 1000, from 85 to 100% by weight of the silicones b) containing one or two polymerizable groups, with silicones b) having only one polymerizable group (b1) used only in admixture with silicones b) having two polymerizable groups (b2) in a weight ratio b1):b2)≦1:1, and c) from 0 to 10% by weight of one or more ethylenically unsaturated hydrolyzable silicon compound monomers or mercaptosilane monomers different from silicones b), the amounts in % by weight for components a) to c) based on the overall weight of the monomers used and adding up to 100% by weight.

in a nonagueous solvent mixture in the presence of at least one free-radical initiator, wherein the nonagueous solvent mixture comprises a mixture of at least two nonagueous solvents of which at least one has a transfer constant C, to vinyl acetate of greater than $20 \times 10^{-4}$ at 70° C., and optionally hydrolyzing the product thus obtained, wherein silicone b) comprises α,ω-divinyl-polydimethylsiloxane(s); a binary mixture of α,ω-divinyl-polydimethylsiloxane(s) and α-monovinyl-polydimethylsiloxane(s); or a ternary mixture of α,ω-divinylpolydimethylsiloxanes, α-monovinylpolydimethylsiloxanes, and non-functionalized polydimethylsiloxanes.

19. The product of claim 18, wherein in the binary and ternary mixtures, the fraction of the non-functional polydialkylsiloxanes is up to 15% by weight, and the fraction of difunctional polydialkylsiloxanes is at least 50% by weight, based in each case on the overall weight of the silicone fraction b).

20. A solid transparent organic silicone copolymer or hydrolysis product thereof, prepared by solution polymerizing monomers comprising:

a1) ≧50% by weight of at least one vinyl ester of optionally branched alkyl carboxylic acids having from 1 to 15 carbon atoms, and a2) from 0 to 20% by weight of one or more monounsaturated olefins and/or dienes, and b) from 1 to 50% by weight of one or more silicones of the formula $R^1_aR_{3-a}SiO(SiR_2O)_nSiR_{3-a}R^1_a$, in which each R is an identical or different monovalent, optionally substituted $C_{1-18}$ alkyl or $C_{1-18}$ alkoxy radical, $R^1$ is a polymerizable group, a is 0 or 1, and n is 10 to 1000, from 85 to 100% by weight of the silicones b) containing one or two polymerizable groups, with silicones b) having only one polymerizable group (b1) used only in admixture with silicones b) having two polymerizable groups (b2) in a weight ratio b1):b2)≦1:1, and c) from 0 to 10% by weight of one or more ethylenically unsaturated hydrolyzable silicon compound monomers or mercaptosilane monomers different from silicones b), the amounts in % by weight for components a) to c) based on the overall weight of the monomers used and adding up to 100% by weight, in a nonaqueous solvent mixture in the presence of at least one free-radical initiator, wherein the nonaqueous solvent mixture comprises a mixture of at least two nonaqueous solvents of which at least one has a transfer constant $C_s$ to vinyl acetate of greater than $20 \times 10^{-4}$ at 70° C., and optionally hydrolyzing the product thus obtained, wherein monomer(s) a) are selected from the group consisting of vinyl acetate; vinyl acetate and ethylene; vinyl acetate and vinyl esters of α-branched monocarboxylic acids having 9 or 10 carbon atoms; and vinyl acetate, ethylene, and vinyl esters of α-branched monocarboxylic acids having 9 or 10 carbon atoms; and silicone(s) b) are selected from the group consisting of a binary mixture of α,ω-divinyl-polydimethylsiloxane(s) with α-monovinylpolydimethylsiloxane(s); and a ternary mixture of α,ω-divinylpolydimethylsiloxane(s), α-monovinylpolydimethylsiloxane(s), and non-functionalized polydimethylsiloxane(s).

21. A process for preparing an organic silicone copolymer or hydrolysis product thereof, comprising polymerizing:

a1) ≧50% by weight of at least one vinyl ester of optionally branched alkyl carboxylic acids having from 1 to 15 carbon atoms, and a2) from 0 to 20% by weight of one or more monounsaturated olefins and/or dienes, and b) from 1 to 50% by weight of one or more silicones of the formula $R^1_a R_{3-a} SiO(SiR_2O)_n SiR_{3-a} R^1_a$, in which each R is an identical or different monovalent, optionally substituted $C_{1-18}$ alkyl or $C_{1-18}$ alkoxy radical, $R^1$ is a polymerizable group, a is 0 or 1, and n is 10 to 1000, from 85 to 100% by weight of the silicones b) containing one or two polymerizable groups, with silicones b) having only one polymerizable group (b1) used only in admixture with silicones b) having two polymerizable groups (b2) in a weight ratio b1):b2)≦1:1, and c) from 0 to 10% by weight of one or more ethylenically unsaturated hydrolyzable silicon compound monomers or mercaptosilane monomers different from silicones b), the amounts in % by weight for components a) to c) based on the overall weight of the monomers used and adding up to 100% by weight, in a nonaqueous solvent mixture in the presence of at least one free-radical initiator, wherein the nonaqueous solvent mixture comprises a mixture of at least two nonaqueous solvents of which at least one has a transfer constant $C_s$ to vinyl acetate of greater than $20 \times 10^{-4}$ at 70° C., and optionally hydrolyzing the product thus obtained.

22. The process of claim 21, wherein from 3 to 40% by weight of a mixture of the monomers a), b), and optionally c) is introduced as an initial charge into a polymerization reactor, and the remainder of the monomers a), b), and optionally c) is metered in as a mixture.

23. The process of claim 21, comprising hydrolyzing an organic silicone copolymer product in alcoholic solution in the presence of an acidic or an alkaline catalyst.

* * * * *

UNITED STATES PATENT AND TRADEMARK OFFICE
CERTIFICATE OF CORRECTION

PATENT NO. : 7,288,592 B2
APPLICATION NO. : 10/507241
DATED : October 30, 2007
INVENTOR(S) : Kurt Stark et al.

It is certified that error appears in the above-identified patent and that said Letters Patent is hereby corrected as shown below:

Column 15, Line 23, Claim 1:

After "phase angle δ of"
Insert -- $\leq$ --.

Column 16, Line 22, Claim 18:

Delete "R1" and insert therefor

-- $R^1$ --.

Column 16, Line 37, Claim 18:

Delete "agueous" and insert therefor

-- aqueous --.

Column 16, Line 38, Claim 18:

Delete "agueous" and insert therefor

-- aqueous --.

Column 16, Line 40, Claim 18:

Delete "agueous" and insert therefor

-- aqueous --.

Column 17, Line 15, Claim 20:

Delete "agueous" and insert therefor

-- aqueous --.

UNITED STATES PATENT AND TRADEMARK OFFICE
CERTIFICATE OF CORRECTION

PATENT NO. : 7,288,592 B2
APPLICATION NO. : 10/507241
DATED : October 30, 2007
INVENTOR(S) : Kurt Stark et al.

It is certified that error appears in the above-identified patent and that said Letters Patent is hereby corrected as shown below:

Column 17, Line 16, Claim 20:

Delete "agueous" and insert therefor

-- aqueous --.

Column 17, Line 17, Claim 20:

Delete "agueous" and insert therefor

-- aqueous --.

Signed and Sealed this

Twenty Second Day of April, 2008

JON W. DUDAS
*Director of the United States Patent and Trademark Office*